United States Patent [19]
Baker

[11] 3,756,746
[45] Sept. 4, 1973

[54] BLADE OR VANE FOR A GAS TURBINE ENGINE

[75] Inventor: Alan Anthony Baker, Bramcote, England

[73] Assignee: The Secretary of State for Defense in Her Britannic Majesty's Government of the United Kingdom of Great Britain and Northern Ireland, Whitehall, London, England

[22] Filed: Sept. 13, 1971

[21] Appl. No.: 180,049

[30] Foreign Application Priority Data
Sept. 15, 1970 Great Britain.................. 43,924/70

[52] U.S. Cl................................ 416/230, 416/241
[51] Int. Cl............................................. F01d 5/14
[58] Field of Search................. 416/230, 229, 241 A

[56] References Cited
UNITED STATES PATENTS 2,868,439   1/1959   Hampshire et al........... 416/220 UX
2,919,889   1/1960   Rubel.......................... 416/241 UX
3,371,407   3/1968   Forsyth et al................ 416/230 UX
3,403,844   10/1968  Stoffer................................ 416/230
3,616,508   11/1971  Wallett........................... 416/230 X

FOREIGN PATENTS OR APPLICATIONS 596,636    1/1948    Great Britain...................... 416/230
619,634    3/1949    Great Britain...................... 416/230
787,500    12/1957   Great Britain...................... 416/230

OTHER PUBLICATIONS

A.P.C. Application of Bitterli et al., No. 318,662, Published June 8, 1943.

Primary Examiner—Everette A. Powell, Jr.
Attorney—Cushman, Darby & Cushman

[57] ABSTRACT

The invention relates to a blade or vane for a gas turbine engine which comprises a carbon fibre reinforced matrix material which is further strengthened by strong ductile metal wires whose modulus of elasticity is similar to that of the carbon fibres.

10 Claims, 4 Drawing Figures

BLADE OR VANE FOR A GAS TURBINE ENGINE

This invention relates to a blade or vane for a gas turbine engine.

Such blades or vanes should preferably be as light as possible, but should be able to withstand stresses which arise in certain conditions such as in bird ingestion. Previously, blades have been made from carbon fibre reinforced materials, but since these fibres do not absorb sufficient energy before fracturing, it has been difficult to make a blade capable of withstanding very severe overloads without breaking off and consequently further damaging the engine.

The present invention provides a blade or vane which can be arranged to withstand considerable overload without breaking off.

According to the present invention a blade or vane for a gas turbine engine comprises a carbon fibre reinforced matrix material and a further reinforcement of piano wires or other strong ductile metal wires with a comparative modulus embedded within the matrix and extending longitudinally the blade.

The fraction of the blade made up of the wire reinforcement will vary according to the specific requirements to be met, but we prefer to use some 10 percent by volume of the wire to keep the blade density as low as possible.

The wires need not be evenly dispersed throughout the cross section of the blade, nor need they extend over the full length of the blade. Thus the reinforcement may be concentrated near the blade surface or near the leading and trailing edges of the blade, and may extend from the blade root over only the inner major part of the blades longitudinal extent.

The wires need not be of a similar diameter to the carbon fibres, and we find that an epoxy resin matrix, possibly with added polysulphone, is quite effective.

Figure 1:
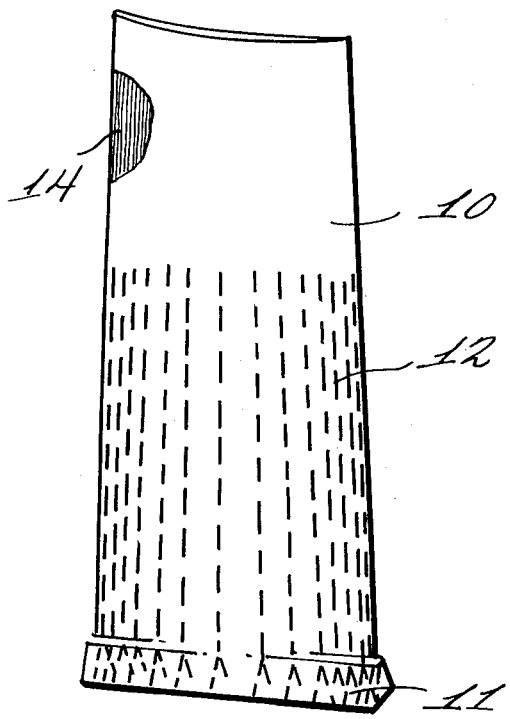
FIG. 1 is a perspective view of a blade of the present invention, the metal wire being shown in broken lines and the carbon fibres being shown in a broken away portion of the blade.
Figure 4:
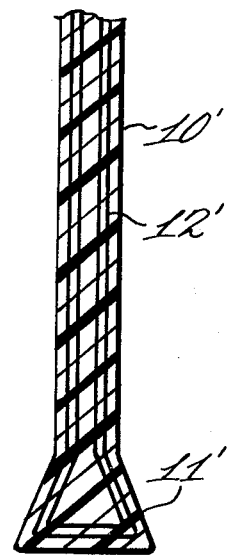
FIG. 4 is a longitudinal sectional view of a further modification of the present invention.

FIG. 1 of the accompanying drawings shows how the piano wires may be distributed over a blade. The blade comprises an aerofoil section 10 and a root portion 11; it will be seen that the piano wires 12 are concentrated near the outer surface of the blade mainly and may also be near the leading and trailing edges of the aerofoil section, and that they extend from within the root section to end some three-fourths of the way up the aerofoil. In this way the wires 12 are rigidly attached at the root, and extend over that portion of the blade most likely to be damaged by bird ingestion and to break off. The outer one-fourth of the aerofoil is unlikely to break off, and if it did, would not be sufficiently massive to cause major damage to the rest of the engine or cause serious out-of-balance loading problems, therefore some weight can be saved by stopping the wires 12 as shown. As shown in FIG. 4, it might be desirable to form the wires 12' of blade 10' into loops at the root 11' so that a single wire 12' extends down the blade 10', loops at the root, and extends back up the blade. This would provide additional anchoring for the wire.

The principal of underlying the use of the steel wire reinforcement is summarised as follows: Because the carbon fibres (shown at 14 in FIG. 1) are linearly elastic to failure, large deformations, e.g., during impact, result in fibre fracture. Metal wires 12 are not linearly elastic to failure because plastic yielding can occur. Thus under impact it should be possible to retain a large degree of residual strengths in the blade, because of the presence of the unbroken metal wires.

The volume fraction of the wires that can be used must be kept to a minimum in the blade to keep the density to a minimum particularly since the square root of the Modulus/Density ratio determines the blade frequency; this must be as high as possible and since the impact loading is in bending this may be achieved by using the wires in the outer layers. (By using the configuration shown and steel wires of modulus $30 \times 10^6$ p.s.i. compared with carbon fibres of slightly lower modulus the frequency of the blade is changed very little.) However, the volume fraction of wires must be sufficient to contain the C.F. load on the blade after the carbon fibre fracture; this is about 10 percent.

Steel wires are used because they have a similar modulus to the carbon fibres and therefore carry their equal share of the load and because they can be obtained at a low cost with strengths over $400 \times 10^3$ p.s.i.

In testing examples of the construction proposed we have found that the piano wire reinforcement as well as providing a high residual strength gives a surprising improvement in the impact strength of a composite. Thus test pieces were made up by laminating sheets of carbon fibres made by the pyrolysis of polyacrylonitrile and pre-impregnated with an epoxy resin and latent hardener. Control test pieces were made with the carbon fibre and epoxy resin alone; test pices for the blade construction of the invention were made by evenly dispersing some 10 percent by volume of piano wire of $5 \times 10^{-3}$ inch diameter among the carbon fibres (whose diameter was $0.3 \times 10^{-3}$ inch) and the resin matrix.

1. Sample Manufacture

Samples were made by lathe winding $5 \times 10^{-3}$ inch diameter steel wires onto layers of carbon fibre epoxy warp sheet on a steel former. When a sufficient number of layers were formed the carbon fibre epoxy/steel composite was compacted by pressing on the former at 500 lb/in² at 160° C. Carbon fibre epoxy "control" standards were produced in the same way.

Two series of tests were carried out to simulate the effect of impact on a spinning blade.

a. Three point bend to constant deflection b. Longitudinal impact, i.e. fibres running along the specimen length, with impact at 90°.

To measure the residual strengths in each test most of the samples were subsequently pulled in tension.

2. Typical Test Results

3 Point Flexure

| Sample | Flexural Strength $\times 10^3$ p.s.i. | Residual[+] Flexural Strength $\times 10^3$ p.s.i. | Residual Tensile Strength $\times 10^3$ p.s.i. |
| --- | --- | --- | --- |
| Carbon/ Epoxy | 203 ± 11.6 | 24 ± 8 | 18.3 ± 18 |
| Carbon/ Epoxy + Steel wires (about 10%) | 252 ± 19.9 | 66 ± 25 | 53.1 ± 9 |

Limits refer to 90 percent confidence limits.

The residual strength is based on the load supported by the beam after a fixed deflection.

Impact (Small Hounsfield,)
Samples 0.1 inch × 0.05 inch × 1.75 inch
Tup ½ lb for Hyfil, 1 lb for steel/Hyfil

| Sample | Nominal Impact Value ft. lb. | Residual Strengths × 10³ p.s.i. | Strength efficiency % |
|---|---|---|---|
| Carbon fibre Epoxy | 0.34 ± .045 | 6 ± 5 | — |
| Carbon fibre Epoxy + Steel wires (about 10%) | 0.5 ± .08 | 30 ± 7 | 57 (mean) |

The strength efficiency is based on the steel wire volume fraction and strength.

Figure 2:
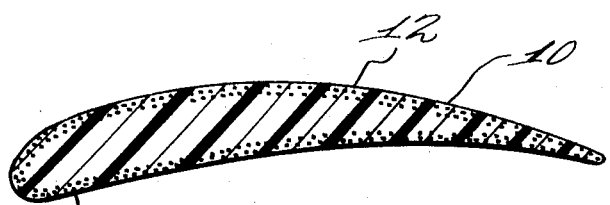
FIG. 2 is a chordwise section of the blade of FIG. 1.
Figure 3:
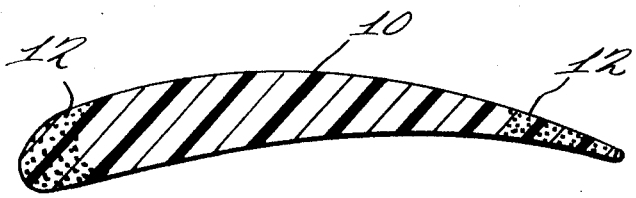
FIG. 3 is a chordwise section similar to the view of FIG. 2 but showing a modified arrangement of the wire reinforcements.

These preliminary results suggest that besides achieving the large increase in residual strengths hoped for, the steel wire reinforcement 12 produces a substantial increase in flexural and impact properties. More efficient use of the steel reinforcement 12 could undoubtedly be made by selective reinforcement, e.g., near to the surface of the blade as discussed and with the wires only going part way up the blade length. As shown in FIG. 2, the wires 12 may be concentrated near the blade surface, the wires 12 preferably extending from the root 11 along a portion of the blade 10. In FIG. 3 there is disclosed a slightly different arrangement of wires 12 and as will be noted, the wires 12 in this environment are concentrated near the leading edge and trailing edge respectively of the blade 10.

It was expected that when the carbon fibres fractured, the piano wire would be capable of plastically deforming to absorb energy and consequently would not break, forming a structure which would retain the blade together when it was subject to bird strike or the like. However, the above tests show that in addition to this behaviour which did appear in the broken test pieces, the piano wire reinforcement 12 also effecting a remarkable improvement in the basic properties of the material before fracture.

It will be appreciated that there are a number of ways of incorporating the piano wires into the composite. Thus one could introduce the wires into sheets of fibres to form "pre-pregs", or complete sheets of the wires could be made and laid up with the carbon fibre sheets.

I claim:

1. A blade or vane for a gas turbine engine comprising a matrix material, a reinforcement of carbon fibres having a predetermined modulus of elasticity, said reinforcement of carbon fibres being embedded in the matrix material, and a further reinforcement of strong ductile metal wires with a modulus of elasticity similar to the predetermined modulus of elasticity of the carbon fibres, said metal wires being embedded within the matrix and extending longitudinal of the blade.

2. A blade or vane for a gas turbine engine as claimed in claim 1 and in which the wire reinforcement comprises 10 percent by volume of the blade.

3. A blade or vane as claimed in claim 1 and in which said wires are concentrated near the blade surface.

4. A blade or vane as claimed in claim 1 and in which said wires extend from the blade root over only the major part of the longitudinal extent of the blade.

5. A blade or vane as claimed in claim 1 and in which said blade comprises an aerofoil portion and a root portion and in which wires extend down at least part of the blade, loop at the root portion of the blade, and extend back up at least part of the blade.

6. A blade or vane as claimed in claim 1 and in which said wires are concentrated near the leading and trailing edges of the blade.

7. A blade or vane as claimed in claim 1 and in which said matrix material comprises a major proportion of epoxy resin.

8. A blade or vane as claimed in claim 7 and in which said matrix material comprises an added proportion of polysulphone.

9. A blade or vane as claimed in claim 7 and in which said wire reinforcement comprises steel wires.

10. A blade or vane as claimed in claim 8 and in which said steel wires comprise piano wire.

* * * * *